(12) United States Patent
Haseyama et al.

(10) Patent No.: US 8,453,432 B2
(45) Date of Patent: Jun. 4, 2013

(54) CONTROL METHOD OF EXHAUST EMISSION PURIFICATION SYSTEM AND EXHAUST EMISSION PURIFICATION SYSTEM

(75) Inventors: Takashi Haseyama, Fujisawa (JP); Akihiro Inamura, Fujisawa (JP); Shinji Gotou, Fujisawa (JP); Hitoshi Satou, Fujisawa (JP); Tatsuo Mashiko, Fujisawa (JP); Akira Hirata, Fujisawa (JP); Noriyuki Tsukamoto, Fujisawa (JP); Futoshi Nakano, Fujisawa (JP); Kouichirou Yomogida, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 534 days.

(21) Appl. No.: 12/449,052

(22) PCT Filed: Dec. 19, 2007

(86) PCT No.: PCT/JP2007/074423
§ 371 (c)(1),
(2), (4) Date: Jul. 22, 2009

(87) PCT Pub. No.: WO2008/090695
PCT Pub. Date: Jul. 31, 2008

(65) Prior Publication Data
US 2010/0012105 A1  Jan. 21, 2010

(30) Foreign Application Priority Data

Jan. 25, 2007 (JP) ................. 2007-014598

(51) Int. Cl.
*F01N 3/00* (2006.01)
(52) U.S. Cl.
USPC ............... 60/286; 60/287; 60/295; 60/297; 60/311

(58) Field of Classification Search
USPC .................. 60/285, 286, 295, 311
See application file for complete search history.

(56) References Cited

U.S. PATENT DOCUMENTS

| | | | |
|---|---|---|---|
| 2005/0217251 A1* | 10/2005 | Sato et al. | 60/295 |
| 2005/0217255 A1* | 10/2005 | Aratsuka et al. | 60/295 |
| 2009/0235647 A1* | 9/2009 | Ikeda et al. | 60/286 |

FOREIGN PATENT DOCUMENTS

| | | | |
|---|---|---|---|
| JP | 2004-150417 | | 5/2004 |
| JP | 2004150417 A | * | 5/2004 |

(Continued)

OTHER PUBLICATIONS

International Search Report issued on Jan. 29, 2008 in corresponding PCT Application No. PCT/JP2007/074423.

(Continued)

*Primary Examiner* — Thomas Denion
*Assistant Examiner* — Patrick Maines
(74) *Attorney, Agent, or Firm* — Staas & Halsey LLP (57) ABSTRACT

An exhaust emission purification system having a controller performing exhaust temperature rise control including multistage delay injection control for raising the exhaust temperature, if the exhaust gas temperature is lower than a predetermined judgment temperature, and performing particulate matter combustion removal control including post injection control, if the exhaust gas temperature becomes equal to or higher than the predetermined judgment temperature, when forced regeneration of a diesel particulate filter is carried out. The multistage delay injection control is forbidden when an idle operation state of an internal combustion engine occurs for a predetermined judgment time and a power take-off device is operating. A control method for exhaust emission purification is also provided sustaining a diesel particulate filter for purifying particulate matter in exhaust gas by executing forced regeneration while avoiding variation in engine speed, even if the power take-off device is operating during an extended idling operation.

4 Claims, 2 Drawing Sheets

FOREIGN PATENT DOCUMENTS

| | | |
|---|---|---|
| JP | 2004-156549 | 6/2004 |
| JP | 2005-139944 | 6/2005 |
| JP | 2005139944 A * | 6/2005 |
| JP | 2005-299456 | 10/2005 |
| JP | 2008223612 A * | 9/2008 |

OTHER PUBLICATIONS

Patent Abstracts of Japan, Publication No. 2004-150417, Published May 27, 2004.

* cited by examiner

CONTROL METHOD OF EXHAUST EMISSION PURIFICATION SYSTEM AND EXHAUST EMISSION PURIFICATION SYSTEM

CROSS REFERENCE TO RELATED PATENT APPLICATIONS

This application claims the benefit under 35 U.S.C. Section 371, of PCT International Application No. PCT/JP2007/074423, filed Dec. 19, 2007, which claimed priority to Japanese Application No. 2007-014598, filed Jan. 25, 2007 in the Japanese Intellectual Property Office, the disclosures of which are hereby incorporated by reference.

TECHNICAL FIELD

The present invention relates to a control method of an exhaust emission purification system and an exhaust emission purification system requiring forced regeneration of a DPF (diesel particulate filter) in a long time idling even if the PTO device (power take-off device) is in operating state when forced regeneration of a DPF is carried out.

BACKGROUND ART

One example of exhaust gas purification device that captures the particulate matter (PM: particulate matter: referred to as PM, hereinafter) emitted from a diesel engine by a filter which is called a diesel particulate filter (DPF: referred to as DPF, hereinafter) is seen in a continuous regeneration device type DPF device.

In the continuous regeneration device, when the exhaust gas temperature is equal to or more than approximately 350° C., PM captured by DPF burns continuously to be purified and DPF is regenerated by itself. However, when the exhaust gas temperature is low in a case of low speed with low load, catalyst is not activated due to catalyst temperature drop and thereby it becomes difficult to perform self-regeneration of DPF through oxidation of PM. Owing to this, clogging is promoted due to accumulation of PM in the DPF, resulting in a problem of back pressure increase caused by the clogging.

Thereby when the clogging amount of the PM in the DPF surpasses a predetermined value (threshold), exhaust gas temperature is forcibly raised by means of multistage delay injection (multi-injection) in a cylinder (in a tube) or after injection (post injection) and the like to carry out forced regeneration which removes captured PM forcibly through combustion. In this forced regeneration, HC (hydrocarbon) supplied in the exhaust gas through post injection and the like is burnt by oxidation catalyst disposed upstream of the DPF or by DPF-supported oxidation catalyst, the oxidation reaction heat of which is utilized to raise the exhaust gas temperature of the DPF entrance or the filter surface of the DPF. Owing to this, the DPF temperature is raised above the combustion temperature of PM accumulated in the DPF so as to perform combustion removal of the PM.

There are two cases in this forced regeneration, one is manual and the other is automatic. In a case of manual regeneration, when the clogging of the DPF surpasses the predetermined amount, a warning is given to the driver and the driver who receives the warning pushes a button to start the forced regeneration to perform it. On the other hand, in a case of automatic, when the clogging of the DPF surpasses a predetermined amount, no warning is given to the driver, but the forced regeneration is performed automatically even during driving.

Among the forced regenerations, there is a forced regeneration for a long time idling which is carried out when idling state is sustained longer than predetermined time. In vehicles specially equipped with PTO device, however, such as a mobile mixer, a truck crane, a fire engine and so on, when forced regeneration is performed in a state where the PTO device is in operation, variation of rotation tends to occur since the delay combustion is an unstable combustion. In addition, injection timing varies significantly depending on load, which causes a problem of effect of engine speed variation.

Concerning this problem, in prior art, the forced regeneration of the DPF has been forbidden in an idling state and when the PTO device is in operation. For example, as described in Japanese Patent Application Kokai publication No. 2004-150417, in a vehicle specially equipped that is arranged to be able to take out engine power for driving auxiliary unit via PTO device in an idling state, as for an exhaust gas purification device which performs forced regeneration control through raising engine speed in a case where forced regeneration is required in an idling state, such a exhaust gas purification device has been proposed that a regeneration control command is arranged not to be output for performing forced regeneration through such as an additional post-injection or an increase of rotation in a condition where the PTO device is in operation, so as to avoid sudden change of engine operating condition or malfunction of an auxiliary unit, which tend to occur when forced regeneration is performed in a condition where the PTO device is in operating state.

In a similar exhaust emission purification device, for example, as described in Japanese Patent Application Kokai publication No. 2005-139944, such an exhaust gas purification device has been proposed that, placing great importance on the practical performance of the PTO device, temperature rise control command is arranged not to be output from the control device exclusively when the PTO switch is on and operational input is detected for an auxiliary unit via such as a lever specially equipped for external acceleration.

However, in vehicles specially equipped, large amount of PM is accumulated in DPF due to the load of special equipment in shorter time than standard vehicle that has no special equipment. Therefore, if forced regeneration in long time idling operation is forbidden when PTO device is in operation, clogging of DPF is occurred and back pressure is raised excessively causing a problem of engine running malfunction. That is, in a case where low and middle load operation is repeatedly performed as the case where long time idling is in operation while PTO device is in operation, forced regeneration can not be performed despite that PM is accumulated in short time. Owing to this, there is a risk of excessive amount of PM is accumulated in the DPF. If the DPF is reused through forced regeneration so that the PM accumulation is removed, PTO operation has to be suspended, which causes a problem of deterioration of working efficiency.

Patent Document 1: Japanese Patent Application Kokai publication No. 2004-150417
Patent Document 2: Japanese Patent Application Kokai publication No. 2005-139944

DISCLOSURE OF THE INVENTION

The present invention has been accomplished to solve the above problems, an object of which, in vehicles specially equipped with DPF for purification PM in the exhaust emission, is to provide a control method of exhaust emission purification system and an exhaust emission purification system that can sustain DPF in a good state by executing forced regeneration while avoiding variation in engine speed even if the PTO device is in operating state during a long time idling operation.

A control method of the exhaust emission purification system described above includes an exhaust gas purification device which is provided with a diesel particulate filter in an exhaust gas passage of an internal combustion engine mounted on a vehicle, and a control unit which performs an exhaust temperature rise control executing a multistage delay injection control to raise an exhaust temperature when the exhaust gas temperature is lower than a predetermined judgment temperature, and performs PM combustion removal control executing a post injection control when the exhaust gas temperature becomes equal to or higher than said predetermined temperature, when said DPF is regenerated forcedly, wherein said multistage delay injection control is forbidden in a case where idling operation state of the internal combustion engine sustains a predetermined judgment time, and moreover the PTO device (power take-off device) is in operating state.

It should be noted that the word "exhaust temperature" means a temperature of exhaust gas at the spot just out of an exhaust manifold of an internal combustion engine, in other words, a temperature of exhaust gas at the outlet of an internal combustion engine. The word "exhaust gas temperature" means the temperature of the exhaust gas measured in front, back or inside of an exhaust gas purification device.

The "multistage delay injection", which may be called as multi-injection, aims principally at raising the exhaust temperature of the oxidation catalyst up to the catalyst-activation-temperature zone, and does not aim at supplying unburnt fuel in the exhaust gas. The object is to raise the exhaust temperature. Meanwhile, "post injection" is called "after injection" too, which supplies plenty of unburnt fuel in the exhaust gas. This fuel supply allows raising the exhaust gas temperature after passing through the oxidation catalyst, and the DPF regeneration by means of the temperature raising is the main object. Raising the exhaust temperature at the internal combustion engine outlet is not the object, but to supply unburnt fuel in the exhaust gas to oxidize by the oxidation catalyst is the object.

Owing to this, in a vehicle specially equipped with DPF for purification of PM in the exhaust gas, multistage delay injection control for exhaust temperature rise is forbidden during a long time idling operation and when PTO is in operating state, therefore, variation of engine speed of an internal combustion engine that is caused by multistage delay injection while PTO is in operating, can be avoided.

In the control method of the exhaust emission purification system mentioned above, said PM combustion removal control executing post injection control is performed when a forced regeneration is required and moreover the exhaust gas temperature becomes equal to or higher than the predetermined judgment temperature, even if the idling operating state of the internal combustion engine sustains the predetermined judgment time, and said PTO device is in operating state, and moreover said multistage delay injection control is forbidden. In accordance with the above, since PM combustion removal control is carried out even though during a long time idling operation, PTO device is in operating state, and while the multistage delay injection is forbidden, the forced regeneration can be carried out even when during a long time idling operation and PTO is in operating state, and thus DPF can be sustained in a good state.

In the control method of the exhaust emission purification system mentioned above, said multistage delay injection control is performed in a case where said PTO device is not in operating state, when the forced regeneration is required and the exhaust gas temperature is judged lower than said predetermined judgment temperature. In accordance with the above, in a long tome idling operation and the PTO is not in operating state, the exhaust temperature can be raised and PM accumulated in the DPF can be removed through combustion efficiently.

In the control method of the exhaust emission purification system mentioned above, said PM combustion removal control executing post injection control is performed in a case where said PTO device is not in operating state, when the forced regeneration is required and moreover the exhaust gas temperature becomes equal to or higher than said predetermined judgment temperature. In accordance with the above, PM combustion removal can be performed in a long idling operation and the PTO device is not in operating state, and thus the PDF can be sustained in a good state efficiently.

Moreover, the control method of the exhaust emission purification system to achieve the above object is arranged so that in an exhaust emission system including an exhaust gas purification device which is provided with a DPF in a exhaust gas passage of an internal combustion engine mounted on a vehicle, and a control unit which performs an exhaust temperature rise control executing a multistage delay injection control to raise an exhaust temperature when the exhaust gas temperature is lower than a predetermined judgment temperature, and performs PM combustion removal control executing a post injection control when the exhaust gas temperature becomes equal to or higher than said predetermined temperature, when said DPF is regenerated forcibly, wherein said control unit performs such a control that said multistage delay injection control is forbidden in a case where idling operation state of the internal combustion engine sustains the predetermined judgment time, and moreover the PTO device is in operating state.

Owing to this arrangement, in a vehicle equipped specially with the DPF for purification of PM in the exhaust gas, since the multistage delay injection control for the exhaust temperature rise is forbidden in the long time idling operation and moreover the PTO is in operation state, variation of internal combustion engine speed caused by the multistage delay injection while the PTO is in operation, can be avoided.

In the exhaust emission purification system mentioned above, said control unit is arranged to perform such a control that said PM combustion removal control requiring the post injection control is performed when a forced regeneration is required and moreover the exhaust gas temperature becomes equal to or higher than said predetermined judgment temperature, even if the idling operating state of the internal combustion engine sustains the predetermined judgment time, and said PTO device is in operating state, and moreover said multistage delay injection control is forbidden. Owing to this arrangement, since the PM combustion removal control is performed even when during a long time idling operation and the PTO device is in operation state and moreover while the multistage delay injection is forbidden, the forced regeneration can be executed even when during a long time idling operation and the PTO device is in operation state, and thus the DPF can be sustained in good state.

In the exhaust emission purification system mentioned above, said control unit is arranged to perform such a control that said multistage delay injection control is performed in a case where said PTO device is not in operating state, when the forced regeneration is required and the exhaust gas temperature is judged lower than said predetermined judgment temperature. Owing to this arrangement, the exhaust temperature can be raised when in the long time idling operation and the PTO device is not in operation, and thus PM accumulated in the DPF is removed through combustion efficiently.

In the exhaust emission purification system mentioned above, said control unit is arranged to perform such a control that said PM combustion removal control executing post injection control is performed in a case where said PTO device is not in operating state, when the forced regeneration is required and the exhaust gas temperature becomes equal to or higher than said predetermined judgment temperature. Owing to this arrangement, PM can be removed through combustion in the long time idling operation and the PTO device is not in operating state, and thus the DPF can be sustained in a good state.

It should be noted that, as an example of this exhaust emission purification system, there is such an exhaust emission purification system including an exhaust gas purification device in which the oxidation catalyst device supporting the oxidation catalyst and the DPF are disposed in order from the upstream side in the exhaust passage, an exhaust gas purification device in which the DPF supporting oxidation catalyst is disposed in the exhaust passage of an internal combustion engine, and the like.

According to the control method of the exhaust emission purification system and the exhaust emission purification system, in vehicles equipped specially with DPF for purification of the PM in the exhaust gas, the DPF regeneration control forbids multistage delay injection (multi injection) which causes variation of engine speed, when PTO is in operation during a long time idling. Therefore, variation of engine speed when PTO is in operation, can be avoided.

In addition, since engine load condition is monitored and forced regeneration is arranged to be feasible when PTO is in operation with such heavy load that allows to perform forced regeneration of DPF, the forced regeneration is executed even while PTO is in operation. Therefore, the problem of excessive accumulation of PM in DPF is solved, and problems of back pressure increase while engine is in operating state disappear. In other words, forced regeneration of the DPF is allowed without PTO operation stoppage, thus avoiding clogging of DPF.

EXPLANATIONS OF LETTERS OR NUMERALS 1 exhaust emission purification system
10 diesel engine
11 exhaust passage
12 exhaust gas purification device
12a oxidation catalyst device
12b catalyst carried filter
26 PTO device (Power Take-off Device)
27 PTO switch
32 exhaust gas temperature sensor at entrance of oxidation catalyst device
33 exhaust gas temperature sensor at entrance of filter
40 control device (ECU)
A air
G exhaust gas
Gc purified exhaust gas Tg1 exhaust gas temperature at the entrance of the oxidation catalyst device
Tg2 exhaust gas temperature at the entrance of the filter
Tc1 predetermined first judgment temperature (predetermined judgment temperature)
Tc2 predetermined second judgment temperature
ta accumulated time of PM combustion
tac predetermined judgment time
ti sustained time of idling operation state
tic predetermined judgment time

DESCRIPTION OF THE EMBODIMENTS

Figure 1:
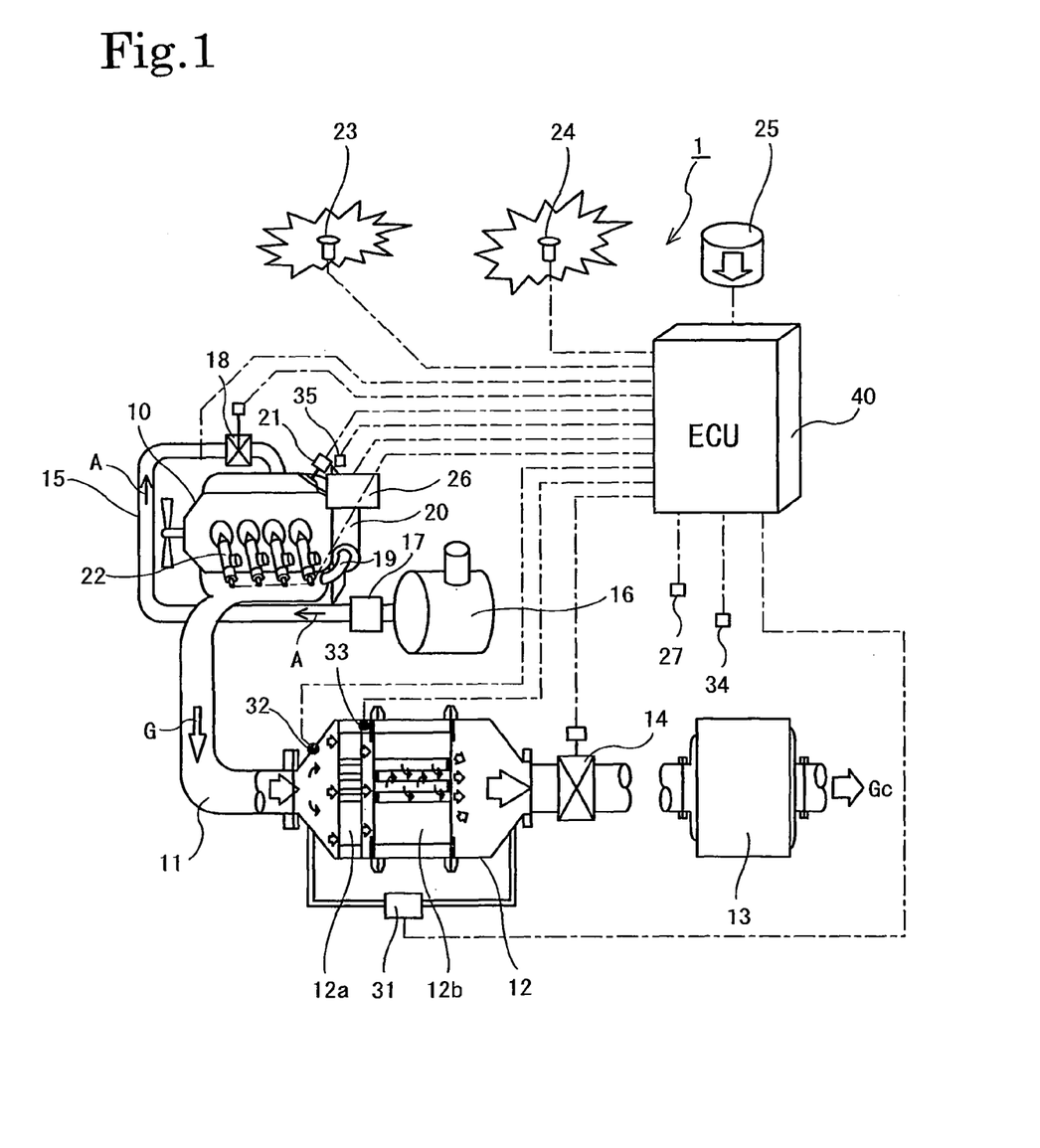
FIG. 1 shows overall structure of the exhaust emission purification system according to an embodiment of the present invention.

Hereinafter, the method of the exhaust emission purification system and the exhaust emission purification system according to embodiments of the present invention will be described referring to the drawings. FIG. 1 shows a structure of the exhaust emission purification system 1 according to an embodiment.

This exhaust emission purification system 1 is composed of an exhaust gas purification device 12 and a silencer 13 which are disposed in an exhaust passage 11 of a diesel engine (internal combustion engine). This exhaust gas purification device 12 is one of continuous regeneration-type DPF (Diesel Particulate Filter) devices, which is composed of an oxidation catalyst device 12a disposed in the upstream side and a catalyst-carried filter device (DPF) 12b disposed in the downstream side. Exhaust gas G is purified through the exhaust gas purification device 12 and the purified exhaust gas Gc is emitted in the atmosphere via the silencer 13.

The oxidation catalyst device 12a is formed so that an oxidation catalyst such as platinum is carried on a supporting body with honeycomb structure made of porous ceramics and the like. The catalyst-carried filter device 12b is formed by a wall-flow type filter of monolith honeycomb structure, which is arranged so that the entrance and outlet of a porous ceramics honeycomb channels are alternatively sealed. Catalysts such as platinum or cerium oxide are carried on apart of the filter. The porous ceramic wall captures PM (particulate matter) in the exhaust gas.

In order to estimate the amount of accumulated PM in the catalyst-carried filter device 12b, a differential pressure sensor 31 is provided at a conduction pipe connected at the front and rear of the exhaust gas purification device 12. In addition, in the downstream side of the exhaust gas purification device 12, an exhaust throttle valve 14 is provided as an exhaust throttle means.

In an intake passage 15, an air cleaner 16, MAF sensor (intake air volume sensor) 17, and intake throttle valve (intake throttle) 18 are provided. The intake throttle valve 18 controls the volume of intake air A to the intake manifold. Further, in EGR passage 19, EGR cooler 20 and EGR valve 21, which controls EGR volume, are provided.

Still further, in order to control the forced regeneration of the catalyst-carried filter device 12b, an exhaust gas temperature sensor 32 for the oxidation catalyst entrance is provided at the upper-stream side of the oxidation catalyst device 12a and an exhaust gas temperature sensor 33 for the filter catalyst entrance is provided between the oxidation catalyst device 12a and the catalyst-carried filter device 12b. The exhaust gas temperature sensor 32 for the oxidation catalyst entrance detects the exhaust gas temperature Tg1 at the oxidation catalyst entrance, which is the temperature of the exhaust gas G flowing into the oxidation catalyst device 12a. The exhaust gas temperature sensor 33 for the filter catalyst entrance detects the exhaust gas temperature Tg2 at the filter entrance, which is the temperature of the exhaust gas G flowing into the catalyst-carried filter device 12b.

Output values from these sensors are input to the control unit (ECU: Engine Control Unit) 40, which controls the operation of the engine 10 generally as well as controls forced regeneration of the exhaust gas purification device 12. Control signals that are output from the control unit 40 control the exhaust throttle valve 14, intake throttle valve 18, EGR valve 21, fuel injection device (injection nozzle) 22, and the like.

The fuel injection device 22 is connected to the common rail injection system (not shown) which temporarily reserves highly pressurized fuel by the fuel pump (not shown). To the control unit 40, such information as an accelerator opening from accelerator position sensor (APS) 34, engine speed from a engine speed sensor 35 as well as the information such as vehicle speed, coolant temperature, and the like are input for operation of the engine 10. In addition, electric current passage duration is output so that predetermined amount of fuel is injected from the fuel injection device 22.

A flasher (DPF lump) 23, an emergency light lump 24 and manual regeneration button (manual regeneration switch) 25 are provided. These flashing light 23, 24 are warning means to attract the driver's attention when the captured amount of PM in the catalyst-carried filter 12b surpasses the predetermined amount and clogging of the catalyst-carried filter 12b occurs, so that the driver can stop the vehicle voluntarily to perform forced regeneration. In this way, in the forced regeneration control of the exhaust gas purification device 12, not only automatic regeneration while driving but also manual regeneration can become available. In addition, a PTO device (power take-off device) 26 is provided to take out the power of the engine 10. A PTO switch 27 is arranged to switch on and off the PTO device. Signals from the PTO switch 27 are input to the control unit 40, and the control unit 40 is arranged so as to perform the operation of PTO device 26.

In controlling of the exhaust emission purification system 1, PM is captured in a normal operation. In the normal operation, whether it is the time to start the forced regeneration or not is monitored, and if it is judged to start the forced regeneration, the forced regeneration is performed. In this forced regeneration, there are an automatic regeneration while driving and a manual regeneration that starts when the driver stops the vehicle to push a manual regeneration button 25. These regenerations are suitably selected to be performed depending on running distance or differential pressure value of the DPF. The manual regeneration can solve a problem of oil dilution, which is caused by mingling unburnt fuel with engine oil (lubrication oil) due to post injection in case of forced regeneration while driving in automatic regeneration occasion during driving. At the same time, when the problem of oil dilution does not occur, the automatic regeneration can avoid annoying of manual regeneration, which is to input a signal to start regeneration by the driver (to stop the vehicle and push regeneration button, and so on).

In this forced regeneration, when either the exhaust gas temperature Tg2 at the filter entrance or the exhaust gas temperature Tg1 at the oxidation catalyst entrance is lower than the predetermined first judgment temperature Tc1 (approximately 250° C.), a multistage delay injection (multi-injection) is carried out. The exhaust gas temperature Tg2 at the filter entrance is an exhaust gas temperature detected by an exhaust gas temperature sensor 33 at the filter entrance or by an exhaust gas temperature sensor 32 at the oxidation catalyst entrance. Owing to this control, an exhaust temperature rise control is performed, which is to raise an exhaust temperature that is the exhaust gas temperature when exhausted from the engine 10. Then either the exhaust gas temperature Tg2 at the filter entrance or the exhaust gas temperature Tg1 at the oxidation catalyst entrance becomes equal to or higher than the predetermined first judgment temperature Tc1 (approximately 250° C.), PM combustion removal control requiring post injection is performed. Hence, the regeneration of the catalyst-carried filter 12b is carried out. In this forced regeneration, the exhaust throttle valve 14 is closed to implement exhaust throttling when the vehicle stands still. Note that the regeneration control unit that carries out the forced regeneration is integrated in the control unit 40. In the PM combustion removal control, the multistage delay injection and the post injection are combined, if necessary.

The predetermined first judgment temperature Tc1 is a temperature at which the oxidation catalyst of the oxidation catalyst device 12a is activated when Tc1 is surpassed, and the temperature is set at approximately 250° C., for example. The PM that is captured in the catalyst-carried filter 12b is burnt and removed when temperature Tg2 of the exhaust gas that flows into the catalyst-carried filter 12b becomes above the predetermined second judgment temperature Tc2 (for example, 350° C.). By means of the combustion removal of PM, the catalyst-carried filter 12b is regenerated.

In the present invention, when the sustained time ti of idling operation state surpasses a judgment time tic, the engine operation is regarded as a long time idling operation. During the long idling operation, if the PTO device 26 is in operating state, the multistage delay injection control to raise the exhaust temperature is forbidden so as to avoid engine speed variation of the engine 10 even if the exhaust gas temperature Tg2 (or Tg1) is less than the predetermined first judgment temperature Tc1. However, even while forbidding the multistage delay injection, when the exhaust gas temperature Tg2 (or Tg1) becomes equal to or above the predetermined first judgment temperature Tc1, that is, the oxidation catalyst temperature surpasses the activation temperature, the PM combustion removal control executing the post injection control is carried out. Owing to the PM combustion removal control, the temperature of the exhaust gas that flows into the catalyst-carried filter 12b is raised and the forced regeneration of the catalyst-carried filter 12b is performed.

In other words, even when the PTO device 26 is in operating state in the long time idling regeneration, the forced regeneration of the catalyst-carried filter 12b is arranged to be executed. Due to this fact, in a case where the exhaust gas temperature is high, for example engine load condition is above a predetermined value, the regeneration of the catalyst-carried filter 12b becomes feasible. In this control, the multistage delay injection control, which is carried out in a case where the exhaust gas temperature is low, is forbidden to avoid variation of the engine speed.

It should be noted that exhaust temperature rise control by the multistage delay injection control is carried out when exhaust gas temperature Tg2 (or Tg1) is equal to or lower than the predetermined first judgment temperature Tc1 in case where long time idling operation is not being performed, or where the PTO device is not in operating state even when long time idling operation is being performed. When the exhaust gas temperature Tg2 becomes equal to or higher than the predetermined first judgment temperature Tc1, the PM combustion removal control by means of the post injection control is carried out. By means of this PM combustion removal control, the exhaust gas temperature flowing into the catalyst-carried filter 12b is raised, and thus the force regeneration of the catalyst-carried filter 12b is carried out.

Hereafter, the judging method of the forced regeneration start in the exhaust emission purification system 1 will be described. For judging of the forced regeneration start, it is possible to use known methods. For example, judging of forced regeneration start timing based on comparison between before and after differential pressure ΔP detected by the differential pressure sensor 31 and the predetermined threshold before and after differential pressure ΔPs, and in addition to the above, judging of forced regeneration start timing based on comparison between running distance ΔM after the previous forced regeneration and the predetermined running distance threshold ΔMs are used to judge the forced regeneration start when ΔP≧ΔPs, or ΔM≧ΔMs is satisfied.

Hereafter, control of the exhaust emission purification system 1 will be described. In the control, PM is captured in normal operation. In the normal operation, whether it is a regeneration timing or not and if it is judged to be the regeneration timing, warning is given or the automatic regeneration while running is performed. In case of the automatic regeneration, regeneration is performed when the driver who received the warning stops the vehicle and operates the manual regeneration button 25.

Figure 2:
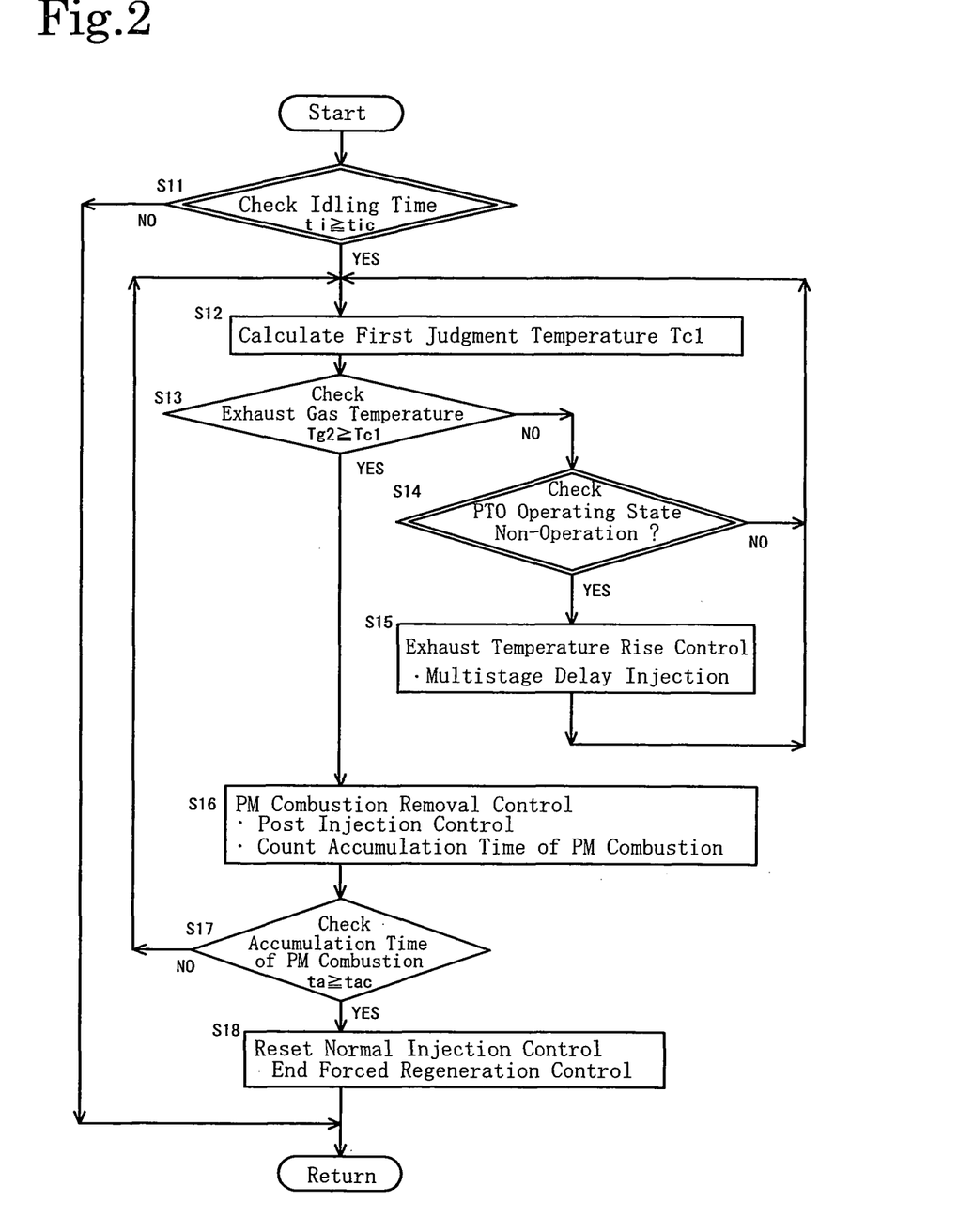
FIG. 2 is an example of flow chart of the forced regeneration during a long time idling operation according to an embodiment of the present invention.

The forced regeneration while a long time idling operation is carried out according to the control flow exemplified in FIG. 2 in this embodiment. The control flow of the forced regeneration while a long time idling operation is presented as a control flow required when it is necessary to perform the forced regeneration.

In the control flow of the forced regeneration in FIG. 2, as an indication temperature of the catalyst temperature that indicates the oxidation catalyst temperature (bed temperature) is used the second exhaust gas temperature Tg2 that is detected by the exhaust temperature sensor 33 at the filter entrance. When the second exhaust gas temperature Tg2 is lower than the predetermined first judgment temperature Tc1, the exhaust temperature is raised through the exhaust temperature rise control by multistage delay injection control exclusively when the PTO is not in operation. When the second exhaust gas temperature Tg2 becomes equal to or higher than the predetermined first judgment temperature Tc1, non-burnt fuel is supplied to the upstream side of the oxidation catalyst device 12a through the PM combustion removal control by the post injection control for both cases of PTO in operation and PTO in non-operation.

As for the indication temperature of the filter temperature that indicates the temperature of the catalyst-carried filter 12b, the second exhaust gas temperature Tg2 that is detected by the exhaust gas temperature sensor 33 at the filter entrance is also used. It is assumed that PM combustion has been performed when the second exhaust gas temperature Tg2 became equal to or higher than the predetermined second judgment temperature Tc2, and the accumulated time ta of the PM combustion under the condition of Tg2≧Tc2 is counted. The PM combustion removal control is performed until the accumulated time ta of the PM combustion surpasses the predetermined judgment time tac.

When the control flow of FIG. 2 starts, in step S11, whether it is in a long idling state or not is judged by whether idling operation duration time ti becomes equal to or more than the predetermined judgment time tic, that is, by whether idling operation sustained time ti surpasses the predetermined judgment time tic. In judging in the step S11, when the idling operation sustained time ti is less than the predetermined judgment time tic (NO), the forced regeneration according to the forced regeneration flow in FIG. 2 is not carried out, but goes to return. After return, the forced regeneration is carried out in a different known flow of the forced regeneration control depending on necessity.

In this judging of the step S11, when the idling operation sustained time ti is equal to or longer than the predetermined judgment time tic (YES), the procedure goes to step S12 to perform step S12 through step S18, then goes to return. After return, the forced regeneration is not performed in a different flow of the forced regeneration control.

In step S12, the first judgment temperature Tc1, which is the predetermined judgment temperature, is calculated. The first judgment temperature Tc1 is a temperature at which HC, unburnt fuel supplied by the post injection, is oxidized sufficiently by oxidation catalyst of the oxidation catalyst device 12a (for example, approximately 250° C.), when the exhaust gas temperature Tg2 (indication temperature of catalyst temperature) reaches that temperature. For the first judgment temperature, it may be possible to apply a varying value according to engine speed Ne at that moment. The exhaust gas temperature Tg2 is an exhaust gas temperature detected by the filter entrance exhaust gas temperature sensor 33. Instead of the exhaust gas temperature Tg2, however, as a replacement of the filter entrance exhaust gas temperature sensor 33, the exhaust gas temperature Tg1 detected by the oxidation catalyst entrance temperature sensor 32 may be used.

In the next step S13, an exhaust gas temperature (indication temperature of the catalyst temperature) is checked. In this judging, when the second exhaust gas temperature Tg2 is lower than the first judgment temperature Tc1 calculated in the step S12, PTO operation state is checked in step S14.

In this step S14, if the PTO switch 27 is off, or the PTO device 26 is not in operation (YES), the exhaust temperature rise control is carried out in the step S15 during the predetermined time Δt1 (interval-related time between the exhaust gas temperature check in the step S13 and the PTO operation state check in the step S14). After the step S15, the procedure returns to the step S12.

In the exhaust temperature rise control in the step S15, the multistage delay injection is carried out without the post injection based on map data for the multistage delay injection. That is, in the control of the multi delay injection, injection amount and injection timing of the multistage delay injection is calculated to carry out the multistage delay injection referring to the map data for the multistage delay injection using fuel injection amount. This fuel injection amount is calculated from the detected engine speed, the detected acceleration opening, and the like. The map data for the multistage delay injection that determines the injection amount and injection timing of the multistage delay injection is the map data based on the engine speed and the fuel injection amount, in other words, the fuel injection amount that is calculated from the detected acceleration opening and the like. The map data is determined in advance through experiments, calculation and the like and has been input in the control unit 40. The multistage delay injection increases fuel injection amount and delays injection timing of the multistage delay injection than the injection timing in normal operation. The multistage delay injection enhances temperature rise efficiency of the exhaust gas temperature and intends to achieve quick temperature rise of the exhaust gas.

In order to improve the temperature rise efficiency of the exhaust gas temperature, heat escaping is blocked as well as engine load is raised by the operation to close the exhaust throttle valve 14 (or the operation to maintain closed position of the valve). Thereby, the exhaust gas temperature is raised efficiently in a short time and the temperature rise property of the oxidation catalyst device 12a is enhanced.

In step S14, when the PTO switch 27 is on and the PTO device is in operating state (NO), the exhaust temperature rise control of the step S15 executing the multistage delay injection control is not performed, but the procedure returns to the step S12. That is, the multistage delay injection control is forbidden.

In judging of the step S13, if the second exhaust gas temperature Tg2 is equal to or higher than the predetermined first judgment temperature Tc1 (YES), the procedure goes to the step S16. Note that it is possible to do like the following. As the indication temperature of catalyst temperature that indicates the oxidation catalyst temperature, both the second exhaust gas temperature Tg2 detected by the filter entrance exhaust temperature sensor 33 and the first exhaust gas temperature Tg1 detected by the oxidation catalyst entrance exhaust temperature sensor 32 are used. As for the predetermined judgment temperature for each one of the both, the first judgment temperature Tc1 and the third judgment temperature Tc3 are used respectively. When the second exhaust gas temperature Tg2 surpasses the first judgment temperature Tc1 and, at the same time the first exhaust gas temperature Tg1 surpasses the third judgment temperature Tc3, unburnt fuel is arranged to be supplied by the post injection in the upstream side of the oxidation catalyst device 12a.

In the step S16, the PM combustion removal control executing the post injection is carried out during the predetermined time Δt2 (interval-related time such as the exhaust gas temperature check in the step S13). In this PM combustion removal control, the post injection based on the map data for the post injection is carried out. The map data for the post injection that determines injection amount and the injection timing of the post injection is a map data based on the engine speed and the fuel injection amount just as the map data for the multistage delay injection, which are established in advance through experiments and calculation and has been input to the control unit. The fuel injection amount is calculated from the acceleration opening that has been detected.

While supplying fuel to the oxidation catalyst device 12a through the post injection, the fuel is oxidized by the oxidation catalyst and the temperature of the exhaust gas that flows into the catalyst-carried filter 12b is raised. In order to improve the temperature rise efficiency of the exhaust gas temperature, heat escaping is blocked as well as engine load is raised by the operation to close the exhaust throttle valve 14 (or the operation to maintain closed position of the valve). Thereby, the exhaust gas temperature is raised efficiently in a short time and the temperature rise property of the oxidation catalyst device 12a is enhanced.

Moreover, unburnt fuel (HC) is supplied among the exhaust gas by the post injection, the unburnt fuel is oxidized by the oxidation catalyst device 12a and the exhaust gas temperature is raised further by oxidation reaction heat thereof. When the raised exhaust gas temperature Tg2 becomes equal to or higher than the second judgment temperature Tc2, PM captured in the catalyst-carried filter 12b burns. In the step S16, accumulated time of PM combustion is counted. This count is performed only when the second exhaust gas temperature Tg2 is equal to or higher than the second judgment temperature Tc2 (ta=ta+Δt2). After the step S16, procedure goes to the step S17.

In the step S17, in order to judge whether the forced regeneration is completed or not, PM combustion accumulated time ta is checked. In this check, whether PM combustion accumulated time ta surpasses the predetermined judgment time tac or not is checked. That is, if ta surpasses tac, the forced regeneration is deemed to be completed and the procedure goes to the step S18. If not, the forced regeneration is deemed not to have been completed and the procedure returns to the step S12. In addition, until PM combustion accumulated time ta surpasses the predetermined judgment time tac, exhaust temperature rise control in the step S15 or PM combustion removal control in the step S16 is performed.

In the step S18, the forced regeneration control is completed and the normal injection control returns. The procedure goes to return thereafter.

Through this forced regeneration control in operation of the forced regeneration control for the case of long time idling operation, when the second exhaust gas temperature Tg2 (indication temperature of the oxidation temperature) is lower than the predetermined first judgment temperature Tc1, the exhaust temperature rise control S15 executing the multistage delay injection without the post injection in fuel injection inside the cylinder is carried out exclusively in the case where the PTO device 26 is not in operation. When the indication temperature of the oxidation temperature Tg2 is equal to or higher than the first judgment temperature Tc1, regardless whether the PTO device is in operation or not in operation, PM combustion removal control S16 executing the post injection in fuel injection inside in the cylinder is carried out. The second exhaust gas temperature Tg2 (indication temperature of the oxidation temperature) is the exhaust gas temperature detected by the filter entrance exhaust gas temperature sensor 33, or the temperature of exhaust gas that flows into the catalyst-carried filter 12b.

In other words, in the case where the idling state sustained time continues equal to or longer than the predetermined judgment time tic, the procedure goes into the forced regeneration mode for long idling (the step S12 to the step S18) and the forced regeneration starts. In this occasion, even though the PTO device 26 is in operating state, the forced regeneration rushes. At that time, the multistage delay injection control is forbidden to avoid variation of the engine speed. When the filter entrance temperature Tg2 that is detected by the filter entrance exhaust temperature sensor 33 becomes equal to or higher than the first judgment temperature Tc1 (approximately 250° C.), PM combustion removal control executing the post injection control is carried out. The filter entrance temperature Tg2 is detected by the filter entrance exhaust gas temperature sensor 33. By means of this PM combustion removal control, the unburned fuel (HC) that is supplied into the exhaust gas via the post injection is oxidized by the oxidation catalyst 12a and thus the exhaust gas temperature is raised after passing through the oxidation catalyst 12a to perform the forced regeneration.

That is to say, even when long time idling operation is going on and the PTO is in operation, the forced regeneration is performed if the engine running condition allows regeneration of the catalyst-carried filter 12b depending on the condition of the engine load, without the exhaust temperature rise control via the multistage delay injection control.

According to the control method of the exhaust emission purification system and the exhaust emission purification system 1, in the control method of the exhaust emission purification system 1, which includes an exhaust gas purification device 12 having the catalyst-carried filter 12b in the exhaust passage 11 of the engine 10 mounted on a vehicle, and a control unit 40 that performs the exhaust temperature rise control (S15) executing the multistage delay injection control to raise the exhaust temperature when the exhaust gas temperature Tg2 is lower than the predetermined judgment temperature Tc1, and PM combustion removal control (S16) executing the post injection control when the exhaust gas temperature Tg2 becomes equal to or higher than the predetermined judgment temperature Tc1, the multistage delay injection (S15) is forbidden in case where idling operation state of the engine 10 sustains the predetermined judgment time tic and the PTO device 26 is in operating state.

In addition, in the control method of the exhaust emission purification system 1, even in the case where idling operation state of the engine 10 sustains the predetermined judgment time tic, the PTO device 26 is in operating state, and further the multistage delay injection control (S15) is forbidden, PM combustion removal control (S16) is performed if the forced regeneration is required and the exhaust gas temperature Tg2 becomes equal to or higher than the predetermined judgment temperature Tc1.

Further, in the control method of the exhaust emission purification system 1, in case the PTO device 26 is not in operating state, and when the forced regeneration is required and the exhaust gas temperature Tg2 is judged lower than the predetermined judgment temperature Tc1, the multistage delay injection control (S15) is performed. In addition, in case the PTO device 26 is not in operating state, and when the forced regeneration is required and the exhaust gas temperature Tg2 becomes equal to or higher than the predetermined judgment temperature Tc1, PM combustion removal control (S16) executing the post injection control is performed.

Consequently, in a vehicle equipped specially with the catalyst-carried filter 12b for purification of PM in the exhaust gas, the forced regeneration control while PTO is in operation in long time idling forbids the multistage delay injection (S15) that can be a cause of variation of the engine speed. Accordingly, variation of the engine speed while the PTO is in operation can be avoided.

Moreover, since the engine load condition is monitored and the forced regeneration is allowed when the PTO is in operation with such a high load as the force regeneration is feasible, the forced regeneration when the PTO is in operation is executed. Therefore, a problem of PM excessive accumulation in the catalyst-carried filter 12b is resolved and inconvenience of back pressure increase while engine is in operating state disappears. That is, the forced regeneration of the catalyst-carried filter 12b becomes feasible without stopping the PTO operation, and thus the clogging of the catalyst-carried filter 12b is prevented.

It should be noted that a combination of the oxidation catalyst device 12a in upstream side and the catalyst-carried filter 12b has been described as an example in an embodiment so far as an exhaust gas purification device of an exhaust emission purification system. However, a filter that supports an oxidation catalyst may be adopted. Further, the post injection has been described as a method to supply unburnt fuel (HC) in the upstream side of the oxidation catalyst 12a. However, a method of direct injection in an exhaust passage 16 may be adopted, the method being arranged so that a supply unit of unburnt fuel is disposed in the exhaust passage 16 to inject unburnt fuel to the exhaust passage 16 directly from the supply unit of unburnt fuel.

The control method of the exhaust emission purification system and the exhaust emission purification system according to the present invention that has an excellent effect as described so far can be utilized effectively very much for an exhaust emission purification system provided in an internal combustion engine and the like mounted on mobile mixer, sludge vacuuming vehicle, truck crane, fire engine, and the like that are equipped with PTO device.

What is claimed is:

1. A control method for an exhaust emission purification system, comprising:
    providing an exhaust gas purification device with a diesel particulate filter in an exhaust gas passage of an internal combustion engine mounted on a vehicle, and a power take-off device;
    determining whether a forced regeneration is required or not;
    when it is determined that the forced regeneration is required, determining whether an idling operation state is equal to or greater than a predetermined judgment time or not;
    when it is determined that the idling operation state is equal to or greater than the predetermined judgment time, determining whether an exhaust gas temperature is lower than a predetermined judgment temperature or not; and
    when it is determined that the exhaust gas temperature is equal to or greater than the predetermined judgment temperature, carrying out a particulate matter combustion removal control executing a post injection control, but without carrying out a multistage delay injection control, independent of the power take-off device being in an operating state.

2. The control method according to claim 1, further comprising:
    when it is determined that the exhaust gas temperature is lower than the predetermined judgment temperature, determining whether the power take-off device is in the operating state or not;
    when it is determined that the power take-off device is not in the operating state, carrying out the multistage delay injection control; and
    when it is determined that the power take-off device is in the operating state, forbidding the multistage delay injection control.

3. An exhaust emission purification system, comprising:
    an exhaust gas purification device with a diesel particulate filter in an exhaust gas passage of an internal combustion engine mounted on a vehicle;
    a power take-off device; and
    a controller configured to determine whether a forced regeneration is required or not, and when it is determined that the forced regeneration is required, determining whether an idling operation state is equal to or greater than a predetermined judgment time or not and, when it is determined that the idling operation state is equal to or greater than the predetermined judgment time, determining whether an exhaust gas temperature is lower than a predetermined judgment temperature or not and, when it is determined that the exhaust gas temperature is equal to or greater than the predetermined judgment temperature, carrying out a particulate matter combustion removal control executing a post injection control, but without carrying out a multistage delay injection control, independent of the power take-off device being in an operating state.

4. The system according to claim 3, wherein the controller, when it determines that the exhaust gas temperature is lower than the predetermined judgment temperature, determines whether the power take-off device is in the operating state or not and, when it is determined that the power take-off device is not in the operating state, the controller carries out the multistage delay injection control, and when it is determined that the power take-off device is in the operating state, the controller forbids the multistage delay injection control.

* * * * *